United States Patent [19]

Klie et al.

[11] Patent Number: 4,577,219
[45] Date of Patent: Mar. 18, 1986

[54] METHOD AND AN APPARATUS FOR COPYING RETOUCH IN ELECTRONIC COLOR PICTURE REPRODUCTION

[75] Inventors: Jürgen Klie, Toekendorf; Rainer Nehl, Kiel, both of Fed. Rep. of Germany

[73] Assignee: Dr. Ing. Rudolf Hell GmbH, Fed. Rep. of Germany

[21] Appl. No.: 556,330

[22] Filed: Nov. 30, 1983

[30] Foreign Application Priority Data

Dec. 11, 1982 [EP] European Pat. Off. ........ 82111504.5

[51] Int. Cl.⁴ .......................... H04N 1/46; G03F 3/08
[52] U.S. Cl. ........................................ 358/78; 358/75; 358/80
[58] Field of Search .............................. 358/75, 78, 80

[56] References Cited

U.S. PATENT DOCUMENTS 4,285,009  8/1981  Klopsch ................................ 358/76
4,393,399  7/1983  Gast et al. ............................ 358/80

FOREIGN PATENT DOCUMENTS 1407487  9/1975  United Kingdom .

Primary Examiner—James J. Groody
Assistant Examiner—Randall S. Svihla

[57] ABSTRACT

In a method for copying retouch in color picture reproduction, color values are initially acquired by image-point-by-image-point trichromatic color picture scanning and digitization. The color values are deposited in a storage medium and are addressable by image point coordinates. With the coordinate pen of a coordinate acquisition means, the retoucher first marks a read point within a first image region from which a pattern is to be taken and a write point within a second image region into which the pattern is to be copied with image point precision. A distance between the read and write points is determined from the acquired image point coordinates and is fixed. The retoucher then acquires all image point coordinates within the first image region with the assistance of a coordinate pen. The image point coordinates of those image points within the second image region exhibiting the respective fixed distance from the acquired image points are simultaneously identified and a double coordinate pen is thus simulated. For precise pattern transfer, the color values of the first image region addressed with the assistance of the double coordinate pen are replaced image-point-by-image-point by the simultaneously addressed color values of the second image region or by values calculated from the color values.

18 Claims, 8 Drawing Figures

METHOD AND AN APPARATUS FOR COPYING RETOUCH IN ELECTRONIC COLOR PICTURE REPRODUCTION

BACKGROUND OF THE INVENTION

The invention relates to electronic reproduction technology, particularly to the production of corrected and retouched color separations by means of an electronic image processing system (retouch station).

In electronic reproduction, three primary color signals are acquired in a color scanner by means of image point-by-image point and line-by-line, opto-electronic scanning of an original color image. These primary color signals represent the color components red, green, and blue of the scanned image points. A color correction computer corrects the primary color signals and generates the color separation signals required for the production of the color separations therefrom. These color separation signals are a measure for the amounts of printing ink required in the later print. The color separation signals are digitized and stored in a storage medium image point-by-image point as digital color values.

In an image processing system, the stored digital color values of various individual originals can be united according to a layout plan into the dataset of an entire page and/or can be altered for the execution of a subsequent, partial retouch.

In order to record the color separations, the altered digital color values are read out from the storage medium, are converted back into analog color separation signals and are supplied to a recorder in which the rastered or unrastered color separations "magenta", "cyan", "yellow" and "black" are exposed for the production of the printing forms.

A method for partial, electronic retouch is already specified in U.S. Pat. No. 4,393,399, incorporated herein by reference, wherein the digital color values are altered image-point-wise, and partially in accordance with the desired retouch effects in the color image or in the color separation under visual control on a color monitor. The image point coordinates of the color values to be retouched and the desired degree of retouch are defined with the assistance of a marker means in the form of a coordinate pen of a coordinate identification means such that the retoucher guides the coordinate pen similar to a retouch brush over the image part to be retouched.

It can occur in reproduction that the original color image is already damaged in certain parts or that it is damaged during the reproduction process. The retoucher must then attempt to regenerate the damaged image parts of the color image by means of retouching. The success of such a retouch is very imperfect with conventional brush retouching and with the known electronic retouch method, particularly when the damaged image part exhibits a wealth of detail such as, for example, a herringbone pattern.

SUMMARY OF THE INVENTION

It is therefore an object of the invention to specify a method and an apparatus for copying retouch by which information or data of arbitrary image regions are transferred image-point-wise to other arbitrary image regions with high precision.

DESCRIPTION OF THE PREFERRED EMBODIMENTS

Figure 1:
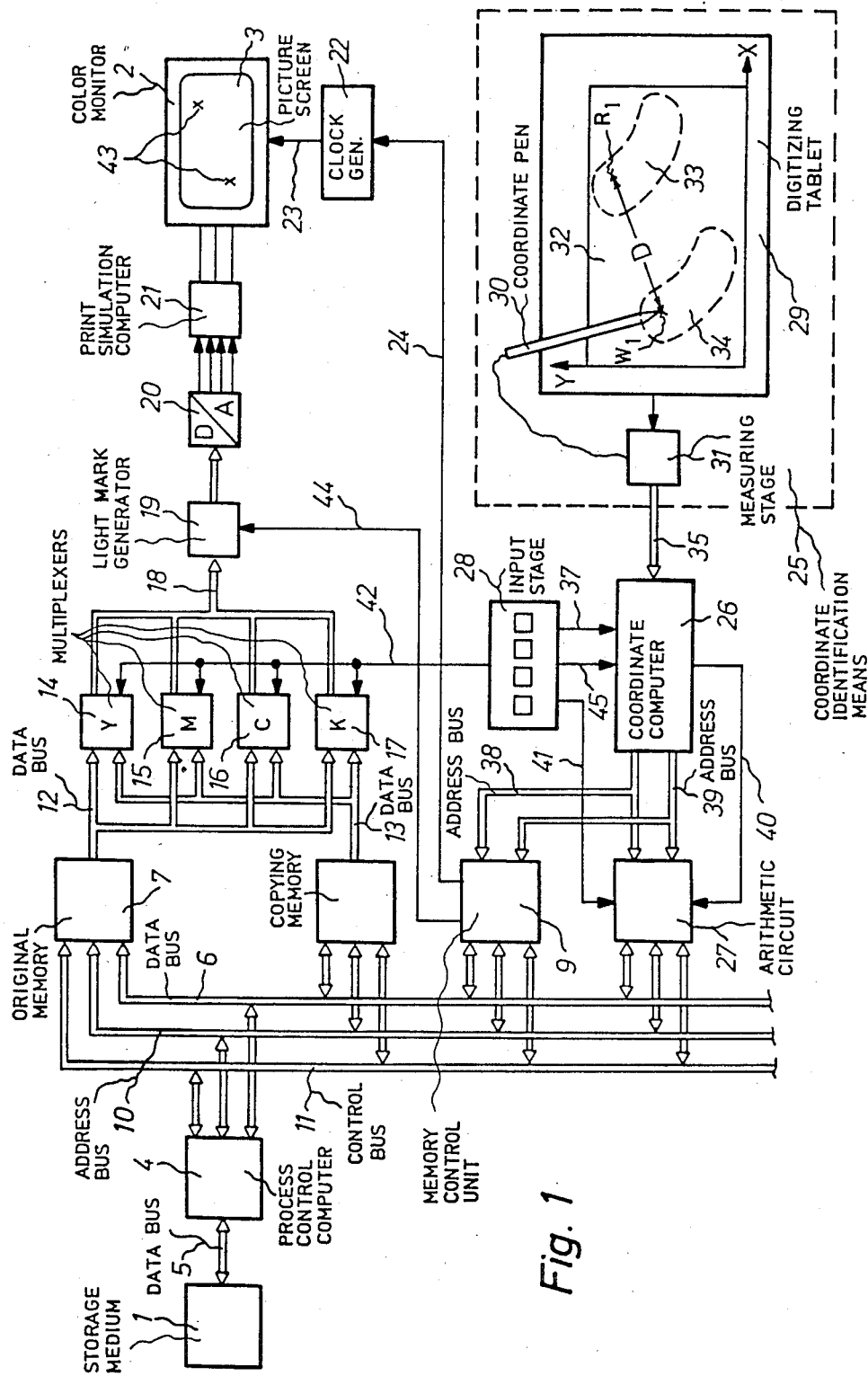
FIG. 1 schematically illustrates an apparatus for the execution of a copying retouch in color image reproduction.

FIG. 1 shows the fundamental format of an apparatus for the execution of a copying retouch in color image reproduction. Such an apparatus is usually referred to as a retouch station.

In the selected sample embodiment, color-corrected digital original color values Y, M, C and K for the color separations "yellow" (Y), "magenta" (M), "cyan" (C) and "black" (K) of a color image to be reproduced are stored in a storage medium 1 (magnetic disc, magnetic tape, etc.). Let the original color values Y, M, C and K—referred to below as F—have, for example, a word length of 8 bits so that 254 gray scales can be discriminated in addition to "black" (0) and "white" (255).

The color image to be retouched can be both an individual image as well as a composed printing page. The digital color values of an individual image were previously acquired in a color scanner by means of point-by-point and line-by-line trichromatic scanning an original color image, by means of color correction, and analog-to-digital conversion of the color separation signals into the digital color values. The color values of an entire printing page arose, for example, in an apparatus for electronic page make-up according to British Pat. No. 1,407,487, incorporated herein by reference, by means of combining the corrected individual image color values according to a layout plan. Uncorrected color values F or color values F already retouched according to U.S. Pat. No. 4,393,399 can, however, also be stored in the storage medium 1.

The retouch station has a color monitor 2 at its command, the color image or a color separation consisting, for example, of 512×512 image points being displayed on its picture screen 3 for visual control during the retouch. The color values F required for the display on the color monitor 2 are selected or calculated from the entire dataset of the storage medium 1 by a process control computer 4 before the beginning of the retouch and are simultaneously transferred into an original memory 7 and a copying memory 8 image point by image point from the storage medium 1 over data busses 5 and 6, so that the contents of the memories 7 and 8 are identical at the beginning of a retouch. The original memory 7 and the copying memory 8 are constructed in the form of image repetition memories for generating a still image on the picture screen 3 of the color monitor 2 and, in accordance with the plurality of color values F required for the representation of the image and their word length, exhibit a respective capacity of 512×512 memory locations of 8 bits each per color separation. Every stored color value F of an image point is addressable in the memories by means of the corresponding locus coordinate pair x and y of said image point. A single image repetition memory can also be employed instead of two image repetition memories.

A memory control unit 9 selectively calls in the addresses of the original memory 7 and/or of the copying memory 8 cyclically over an address bus 10. The stored color values F are read out line-by-line and, within each line, image-point-by-image-point over data busses 12 and 13 with a read clock on a control bus 11 generated in the memory control unit 9 and are supplied to multiplexers 14, 15, 16 and 17. From the multiplexers 14, 15, 16 and 17, the color values F proceed over a shared data bus 18 to a light mark generator 19 and proceed from there to a digital-to-analog converter 20 that converts the digital color values F into four analog color separation signals. A following print simulation computer 21 generates three drive signals r, g and b for the color monitor 2 from the analog color separation signals, whereby the print simulation computer 21 sees to it that the displayed image already conveys the chromatic impression of a true multicolor print. Such a print simulation computer is disclosed in detail in, for example, the U.S. Pat. No. 4,285,009, incorporated herein by reference.

The recording on the picture screen 3 of the color monitor 2 occurs according to progressive interlace in order to obtain a flicker-free image. Based on the technology standard in video, a clock generator 22 generates the horizontal and vertical deflection signals as well as the line start and image start pulses required for the image display on a line 23. Over a further line 24, the memory control unit 9 supplies vertical and horizontal synchronizing pulses to the clock generator 22 so that the point-by-point image displaying on the picture screen 3 of the color monitor 2 is synchronized with the readout of the color values F from the original memory 7 or from the copying memory 8.

The retouch station further comprises a coordinate identification means 25 for marking the locus coordinate pairs x and y, a following coordinate computer 26, an arithmetic circuit 27 for calculating substitution color values F as well as an input stage 28 with a keyboard for the selection of specific functions. The structure and functioning of these components are described in conjunction with the following explanation of the copying retouch.

With the copying retouch, according to the invention a pattern or a structure is taken from an arbitrary image region, referred to below as the read region, and is transferred or copied image-point-wise with high precision into another image region, subsequently referred to as the write region, that is freely selectable with respect to shape and size. The write region can thereby be either a damaged image part in which patterns or structures must be restored or, on the other hand, an image part into which patterns or structures appearing only once in the original color image are to be transferred. The copying retouch can ensue in the color image, i.e. in all color separations, or, on the other hand, in selected color separations.

For the execution of the copying retouch, the original color values $F_R$ of the image points of the desired read region are taken from the original memory 7 and are converted into substitution color values $F^*_W$ in the arithmetic circuit 27. Subsequently, the color values $F_W$ of the corresponding image points of the desired write region are replaced in the copying memory 8 by the substitution color values $F^*_W$.

In a first method step, the desired write region and read region are roughly defined in that the retoucher marks a write point $W_1$ and a read point $R_1$ within the regions with the assistance of a marker means of the coordinate identification means 25 and the distance between the points is determined in the form of coordinate differences.

The coordinage identification means 25 consists of a digitizing table 29, of a marker means in the form, for example, of a coordinate pen 30, and also consists of a measuring stage 31.

For the purpose of explaining the coordinate identification, let it be assumed that the color image 32 to be retouched is situated on the digitizing tablet 29 and not only visually represented on the picture screen 3 of the color monitor 2, as is the case given the actual operating mode of the retouch station. A selected read region 33 in which a pattern is reproduced particularly well, and a corresponding write region 34 into which the pattern is to be transferred, are indicated by broken lines. The selected regions 33 and 34 are roughly defined by the retoucher marking the read point $R_1$ inside the read region 33 and the write point $W_1$ inside the write region 34. Read point $R_1$ and write point $W_1$ are at a distance "D" from one another. The read point coordinates $X_{R1}$ and $Y_{R1}$ as well as the write point coordinates $X_{W1}$ and $Y_{W1}$ output by the measuring stage 31 are transferred over a bus 35 into the coordinate computer 26 and are respectively deposited there in response to an instruction "store". The instruction "store" is given by the retoucher by means of actuating a key in the input stage 28, and being forwarded over a line 37 to the coordinate computer 26. The distance "D" between the marked read point $R_1$ and the write point $W_1$, or the differential coordinate values $x_D$ and $y_D$, are calculated in the coordinate computer 26 according to equations (1):

$$x_D = X_{R1} - X_{W1} \tag{1}$$

$$D = \sqrt{x_D^2 + y_D^2}$$

$$y_D = Y_{R1} - Y_{W1}$$

The calculated differential coordinate values $x_D$ and $y_D$ are likewise stored in the coordinate computer 26, whereby the distance "D" is fixed.

In a second method step, the retoucher marks the desired write region 34 in terms of size and shape by guiding the coordinate pen 30 over the corresponding surface line-by-line in the manner of a retouch brush, whereby the corresponding read region 33 is marked simultaneously according to the invention.

The additional write point W coordinates $x_W$ and $y_W$ marked when sweeping the write points W of the write region 34 proceed directly through the coordinate computer 26 and an address bus 38 to the arithmetic circuit 27 and, as write addresses for the copying memory 8, to the memory control unit 9.

At the same time, the read point coordinates $x_R$ and $y_R$ of those additional read points R that have the distance "D" from the write points W swept by means of the coordinate pen 30 are continuousy calculated in the coordinate computer 26 such that the stored differential coordinate values $x_D$ and $y_D$ are added to the identified write point coordinates $x_W$ and $y_W$ according to equation (2):

$$x_R = x_W + x_D$$

$$y_R = y_W + y_D \quad (2)$$

In this manner, a secod coordinate pen is, so to speak, simulated. It moves at a fixed distance "D" from the coordinate pen 30 synchronously therewith, and sweeps an area as read region 33 which, given the operating mode described, corresponds in shape and size to the write region 34. The transfer or copy of patterns and structures with image point precision is achieved in an advantageous manner with the assistance of this double coordinate pen that simultaneously marks two image points situated at the distance "D" from one another. "Image point precision" means that the image information of each image point within the read image region is transferred exactly to the respective image points within the write image region so that patterns and structures are copied without distortion.

The read point coordinates $x_R$ and $y_R$ output by the coordinate computer 26 likewise proceed to the arithmetic circuit 27 over an address bus 39 and also proceed to the memory control unit 9 as read addresses for the original memory 7.

An instruction "coordinate change", moreover, is always generated in the coordinate computer 26 when the coordinate pen 30 executes a shift by one image point. The instruction "coordinate change" is transmitted to the arithmetic circuit 27 over a control line 40.

Upon a respective instruction "coordinate change", the arithmetic circuit 27 calls over the address bus 10 the read addresses $x_R$ and $y_R$ in the original memory 7 under which the original color values $F_R$ of the read region 33 to be taken are deposited and also calls the corresponding write addresses $x_W$ and $y_W$ in the copying memory 8 under which the original color values $F_W$ of the write region 34 to be replaced by substitution color values are stored.

By means of actuating corresponding keys in the input stage 28, the retoucher determines from which color separations color values $F_R$ are to be taken and in which color separations color values $F_W$ are to be replaced, and also determines the type of color value change. Corresponding instructions "color separation selection" proceed from the input stage 28 over the control line 41 to the arithmetic circuit 27. The retoucher thus has a free hand. The color values $F_R$ of one color separation or of any desired combination of color separations can be transferred into the same color separation, into a different color separation, or into a different arbitrary combination of color separations.

The called original color values $F_R$ and $F_W$ in the original memory 7 and in the copying memory 8 are transferred into the arithmetic circuit 27 over the data bus 6. The substitution color values $F^*_W$ are calculated in the arithmetic circuit 27 from the original color values $F_R$ and, under given conditions, from the original color values $F_W$ as well. The substitution color values $F^*_W$ then are overwritten over the data bus 6 into the addressed write region of the copying memory 8, and the color values originally residing there are cancelled and the color values of the original memory 7 are retained.

Given a first type of copying retouch, the substitution color values $F^*_W$ for the write points W are proportionally calculated from the original color values $F_R$ of the corresponding read points R according to equation (3), whereby the proportion factor "a" can also be a=1:

$$F^*_W = aF_R \quad (3)$$

For that case in which the copying retouch occurs in the color image, i.e. in all color separations, the following relationships derive for the individual color separations:

$$Y^*_W = a_Y Y_R$$

$$M^*_W = a_M M_R$$

$$C^*_W = a_C C_R$$

$$K^*_W = a_K K_R \quad (4)$$

In case the copying retouch is to be executed in a single color separation, for example in the color separation "yellow", then:

$$Y^*_W = a_Y Y_R \quad (5)$$

and, in case the copying retouch is to occur from one color separation onto a different color separation, for example given the transfer of a shadow from the color separation "magenta" to the color separation "black", then:

$$K^*_W = a_M M_R \quad (6)$$

Given a different type of copying retouch, the substitution color values $F^*_W$ for the write points W are calculated according to equation (7) by means of a weighted addition of the original color values $F_W$ of the write points W and the original color values $F_R$ of the corresponding read points R, whereby this type of copying retouch can likewise occur in the entire color image or in one of the separations:

$$F^*_W = a \cdot F_W + b \cdot F_R \quad (7)$$

Ghost images can, for example, be produced with this type of copying retouch. The copying retouch is not restricted to the described types.

In order to evaluate the accomplished copying retouch, the original color image can also be displayed on the picture screen 3 of the color monitor 2 for comparison to the retouched color picture. For this purpose, the original memory 7 or the copying memory 8 can be selectively connected through to the color monitor 2 with the assistance of the multiplexer 14 through 17. The retoucher actuates a corresponding key in the input stage 28, whereby an instruction "picture change-over" is forwarded from the input stage 28 to the multiplexers 14 through 17 over a further control line 42.

The copying retouch can be partially cancelled. For that purpose the retoucher sweeps the desired partial image region with the coordinate pen 30 and the original color values $F_R$ of the addressed memory region of the original memory 7 representing the partial image region are overwritten into the corresponding addressed memory region of the copying memory 8. The copying retouch can also be entirely cancelled. For that purpose all original color values $F_R$ stored in the original memory 7 are overwritten into the copying memory 8.

It had been assumed in order to explain the coordinate identification that a color image is situated on the digitizing tablet 29. This is not present in the actual operating mode of the retouch station. In order to render the points marked on the digitizing tablet visible in this case, corresponding light marks 43 are mixed or gated into the picture screen 3 of the color monitor 2, these moving across the picture screen with the spacing "D" synchronized with the double coordinate pen. For this purpose, the memory addresses cyclically called for the image display are compared in the memory control unit 9 to the addresses marked by the coordinate identification means 25 and, given respective address equality, the instructions "light mark" are forwarded from the memory control unit 9 to the light mark generator 19 over a control line 44. The instructions "light mark" appear precisely at those points in time at which the electron beams of the color monitor 2 sweep the marked write and read points on the picture screen surface. The instructions "light mark" activate the light mark generator 19 which briefly generates identical drive signals for the color monitor 2. As a result thereof, all three electron generating systems of the color monitor 2 are simultaneously switched on with the maximum possible luminance, whereby the "white" light marks 43 arise on the picture screen 3. In order to distinguish the two light marks 43, one of the light marks could be presented flashing or could exhibit a different shape.

The write-side and the read-side image point area influenced by the double coordinate pen can be enlarged in order to be able to sweep larger parts of the color picture faster similar to an enlarged surface of the retouch brush. In this case, the coordinate pen 30 itself marks only the respective center point of the image point area at the write side, whereas the write coordinates $x_W$ and $y_W$ of the write points falling within the image point area at the write side are calculated in the coordinate computer 26 from the marked center point coordinates $x_{WM}$ and $y_{WM}$. The corresponding read point coordinates $x_R$ and $y_R$ of the image point area of the double coordinate pen at the read side are likewise determined in the coordinate computer 26. Size and shape of the image point areas can be defined by the number and position of image points arranged around the marked center point. Size and shape of the image point areas can be prescribed in the coordinate computer 26 over a control line 45 proceeding from the input stage 28. The expanded image point areas or surfaces are indicated by means of correspondingly enlarged light marks 43 on the picture screen 3 of the color monitor 2.

A scale change can be simultaneously executed in the copying retouch in an advantageous manner by means of setting the two image point areas or surfaces of the double coordinate pen differently in terms of shape and size, whereby the scale factor is defined by the area ratio of the image point areas. The substitution color value $F^*_W$ is calculated either by means of a combination or by means of an interpolation of color values since a different number of color values $F_R$ in the original memory 7 to be taken and of color values $F_W$ in the copying memory 8 to be replaced are respectively addressed given different image point areas or surfaces of the double coordinate pen.

Figure 2A:
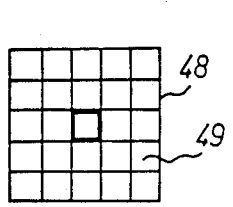
FIGS. 2a–2c show various shapes of brush surfaces.
Figure 2B:
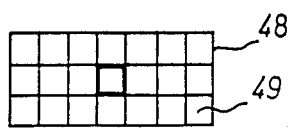
Figure 2C:
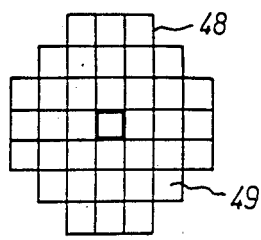

Various shapes and sizes of image point areas or brush surfaces of the double coordinate pen are illustrated in FIGS. 2a through 2c. FIG. 2a shows a square image point area or surface 48 that encompasses 5×5 image points 49; FIG. 2b shows a rectangular image point area 48 having 3×7 image points, and FIG. 2c shows an image point area approximated to the shape of a circle.

Figure 3:
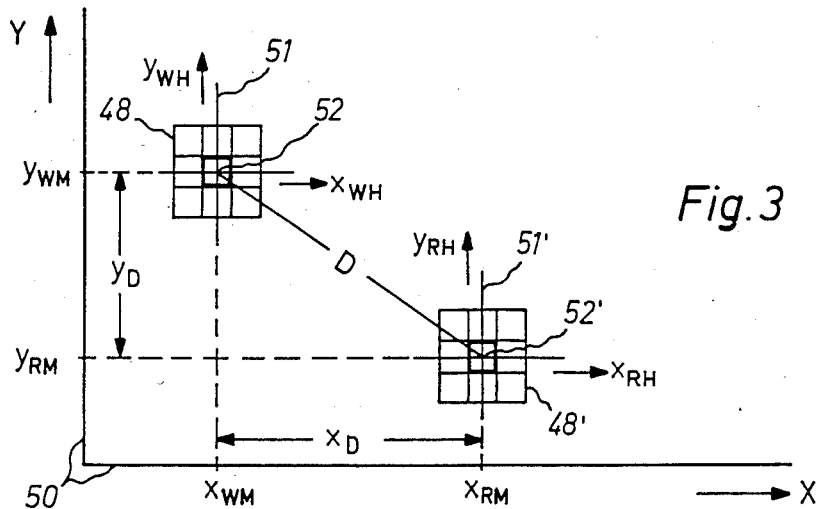
FIG. 3 graphically illustrates coordinate identification.

For the determination of the write point coordinates $x_W$ and $y_W$ as well as the read point coordinates $x_R$ and $y_R$ by means of the double coordinate pen, FIG. 3 shows a graphic illustration with a section of the digitizing tablet 29 of the coordinate identification means 25 with the write-side image point area 48 and the read-side image point area 48' in an arbitrary position of the double coordinate pen.

Within the X/Y coordinate system 50, the write-side image point area 48 has the center coordinates $X_{WM}$ and $y_{WM}$ and the read-side image point area 48' has the center coordinates $x_{RM}$ and $y_{RM}$. Auxiliary coordinate systems 51 and 51' are allocated to the image point areas 48 and 48'. The auxiliary coordinate systems 51 and 51' respectively proceed through the centers 52 and 52' of image point area 48 and 48', respectively, and shift with the movement of the double coordinate pen. The auxiliary coordinates $x_{WH}$ and $y_{WH}$ or $x_{RH}$ and $y_{RH}$ of those image points participating in the formation of the image point areas 48 and 48', with respect to shape and size are defined in the auxiliary coordinate systems 51 and 51'. The centers 52 and 52' of image point areas 48 and 48' have the fixed distance "D" or the coordinate-oriented spacings $x_D$ and $y_D$.

The center coordinates $x_{WM}$ and $y_{WM}$ of the write-side image point area 48 are marked by means of the coordinate pen 30. The write point coordinates $x_W$ and $y_W$ for one of the write points W falling into the write-side image point area 48 are calculated according to the equations (8):

$$x_W = x_{WM} + x_{WH}$$
$$y_W = y_{WM} + y_{WH} \tag{8}$$

The corresponding read point coordinates $x_R$ and $y_R$ for a read point R falling into the read-side image point area 48' are determined according to equations (9), whereby the center coordinates $x_{RM}$ and $y_{RM}$ derive from equation (2):

$$x_R = x_{RM} + x_{RH}$$
$$y_R = y_{RM} + y_{RH} \tag{9}$$

Figure 4:
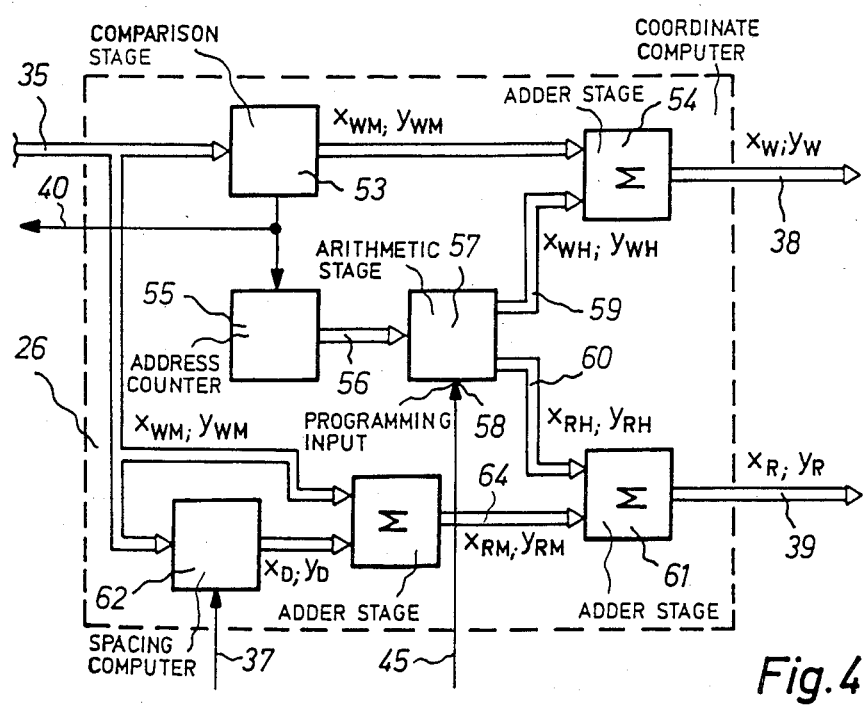
FIG. 4 schematically illustrates a sample embodiment of a coordinate computer.

FIG. 4 shows a sample embodiment of the coordinate computer 26 for that case in which the double coordinate pen exhibits expanded image point areas or surfaces.

The center coordinates $x_{WM}$ and $y_{WM}$ supplied by the coordinate identification means 25 proceed to an adder stage 54 over the bus 35 and a comparison stage 53.

Successive pairs of center coordinates $x_{WM}$ and $y_{WM}$ are continuously compared to one another in the comparison stage 53 and, given a coordinate change appearing upon a displacement of the coordinate pen 30, the comparison stage 53 supplies the instruction "coordinate change" to an address counter 55 on the line 40. The address counter 55—respectively initiated by the instruction "coordinate change"—calls all possible coordinate values cyclically and line-by-line, these being supplied to an arithmetic stage 57 over a data bus 56. Over line 45 and a programming input 58, the arithmetic stage 57 is programmed with the parameters of the desired point areas or brush surface 48 or 48' according to one of the FIGS. 2a through 2c. The coordinate values called by the address counter 55 are subsequently investigated in the arithmetic stage 57 as to whether they fall into the prescribed image point areas 48 or 48'. When this is the case, the called coordinate values are the corresponding auxiliary coordinates $x_{WH}$ and $y_{WH}$ or $x_{RH}$ and $y_{RH}$ of said prescribed image point areas 48 and 48'. The corresponding auxiliary coordinates $x_{WH}$ and $y_{WH}$ of the write-side image point area 48 are forwarded over a data bus 59 to the adder stage 54 in which the write point coordinates $x_W$ and $y_W$ on the address bus 38 are formed according to equations (8). The corresponding auxiliary coordinates $x_{RH}$ and $Y_{RH}$ of the read-side image point area 48' proceed over a data bus 60 to a further adder stage 61. The differential coordinate values $x_D$ and $y_D$ have been previously calculated according to equations (1) in a spacing computer 62 and deposited there. The center coordinates $x_{RM}$ and $y_{RM}$ are calculated in adder stage 63 from the center coordinates $x_{WM}$ and $y_{WM}$ of the write-side image point area 48 and the stored differential coordinate values $x_D$ and $y_D$ from spacing computer 62 according to equations (2), and are supplied over a data bus 64 to the adder stage 61 in which the running read point coordinates $x_R$ and $y_R$ are generated on the address bus 39 according to equations (9).

Figure 5:
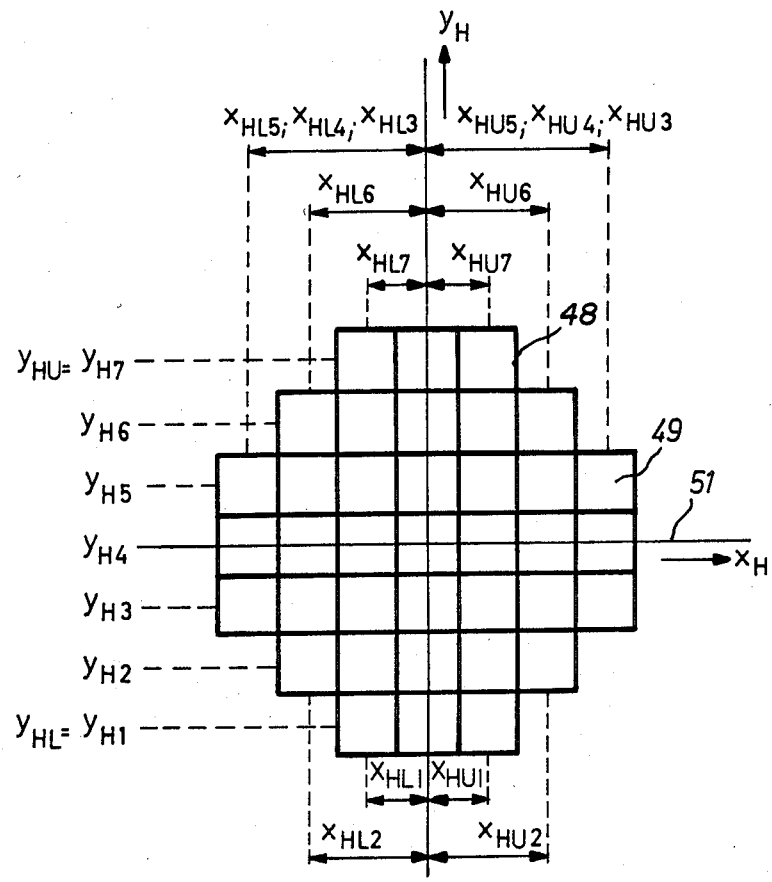
FIG. 5 shows a further graphic illustration of a brush surface.
Figure 6:
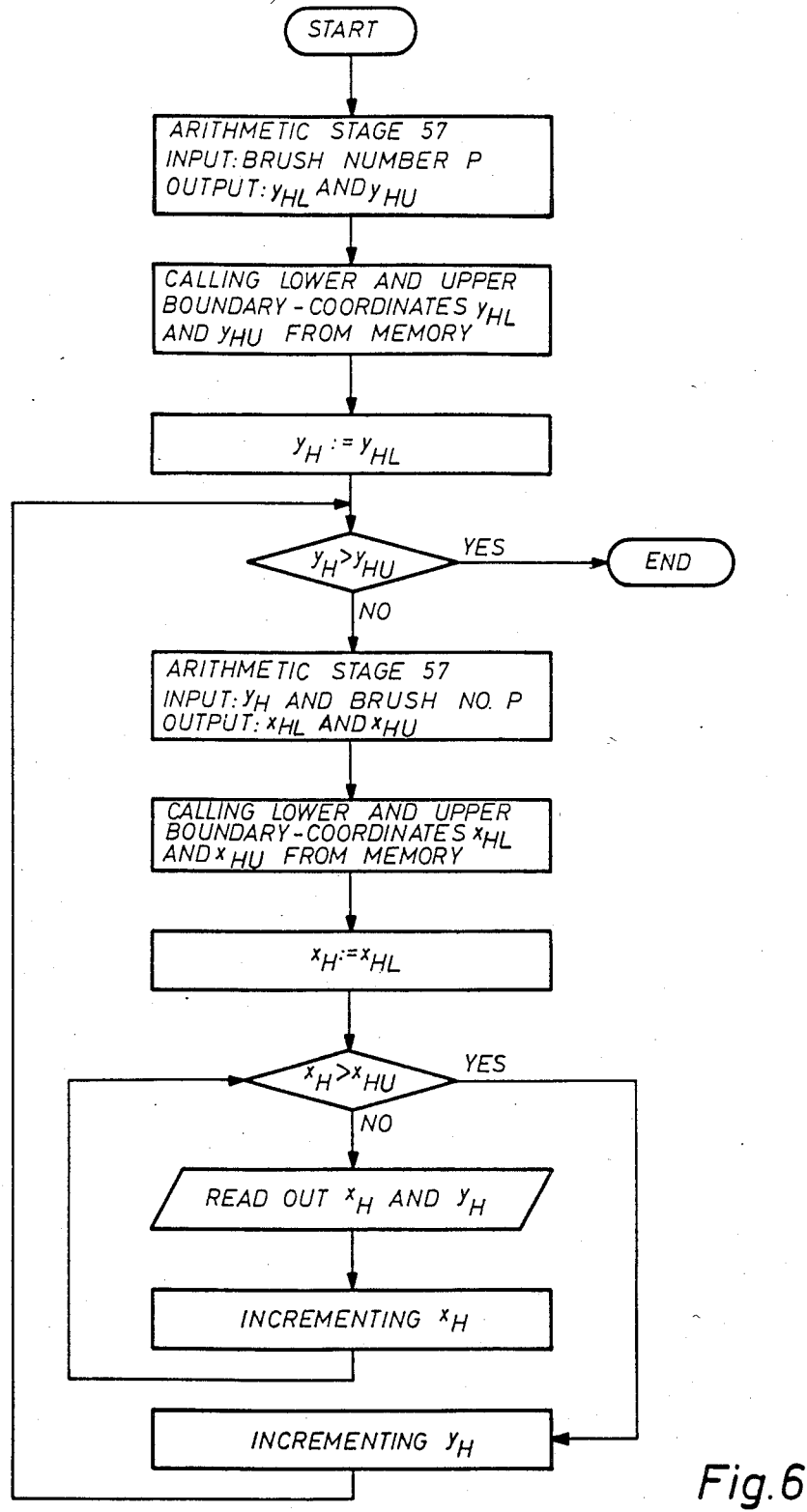
FIG. 6 shows a flow chart for a computational sequence in the arithmetic stage 57 shown in FIG. 4.

The arithmetic stage 57 is programmed with the desired image point area or brush surfaces 48 or 48'. This operation shall be explained in greater detail below with reference to FIGS. 5 and 6. FIG. 5 shows a further graphic illustration of an image point area or brush surface and FIG. 6 shows a flow chart for a computational sequence in the arithmetic stage 57.

As can be seen from FIG. 5, an image point area is first defined in y-coordinates by means of specifying an upper and a lower y-boundary coordinate $y_{HL} = y_{H1}$ and $y_{HU} = y_{H7}$, between which the y-coordinates $y_{H2}$ through $y_{H6}$ lie. The definition of the image point area in x-coordinates occurs by means of specifying corresponding lower and upper x-boundary coordinates $x_{HL}$ and $x_{HU}$ for each y-coordinate, for example, the x-boundary coordinates $x_{HL1}$, $x_{HU1}$ for $y_{HL}$.

The corresponding y-boundary coordinates are first stored in a first table memory of the arithmetic stage 57 for various shapes of image point areas or brush shapes and sizes of image point areas or brush sizes that are identified by a brush number p. The desired brush number p is therefore first input into the arithmetic stage 57 and the corresponding y-boundary coordinates are called in from the first table memory. The x-boundary coordinates $x_{HL}$ and $x_{HU}$ corresponding to the brush shape are tabularly deposited for each y-coordinate value in a second table memory of the arithmetic stage 57.

The auxiliary coordinates $x_H$ and $y_H$ of the image points of the image point area respectively differ by "1": $y_{H2} = y_{HL} + 1$; $y_{H3} = y_{HL} + 2$; etc. For example, the address counter 55 first calls in $y_{HL}$ and then calls in all possible x-coordinate values which are only output as auxiliary coordinates $x_H$ and $y_H$. This occurs, however, only when the x-coordinate values that are called in lie within the x-boundary coordinate values $x_{HL}$ and $x_{HU1}$ for the y-coordinate value $y_{HL}$. The address counter subsequently calls in the y-coordinate value $y_{H2}$ and then again calls in all possible x-coordinate values which are then correspondingly checked. This cycle proceeds according to the flow chart of FIG. 6.

The process control computer 4 and light mark generator 19 are standard assemblies well known to those in this art and are also employed in U.S. Pat. No. 4,393,399, incorporated herein by reference. The memory control unit 9 is shown in FIG. 9 of U.S. Pat. No. 4,393,399. The print simulation computer 21 is known from U.S. Pat. No. 4,285,009 as previously noted. The input stage 28 is a standard keyboard well known to those skilled in this art. Coordinate identification means 25 including digitizing tablet 29, coordinate pen 30, and measuring stage 31 are commercially available and can be purchased for example from Summagraphics Company, 35 Brendwood Ave., Fairfield, Conn., U.S.A. Color values are calculated in arithmetic stage 27 according to the previously specified equations. Simple commercially available arithmetic modules may be interconnected in known manner according to the previous specified equations. For example, two multipliers and one adder may be interconnected for equation 7 previously set forth.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for copying retouch of a color image by transferring image information from a read image region of a color image to a write image region of said color image in electronic color image reproduction, wherein original color signals are obtained by scanning of the color image, the original color signals are converted into color values for a plurality of different color components of the color signals, and the color values are stored in a storage medium image-point-by-image-point, comprising the steps of:

(a) marking an image point as a read point within the read image region of the color image to be retouched, said read image region defining a portion of said color image from which image information is to be taken;

(b) marking an image point as a write point within the write image region of the color image to be retouched, said write image region defining a portion of said color image into which the image information taken from said read image region is to be transferred;

(c) identifying coordinates of said marked read point and said marked write point;

(d) determining a vector distance between said read point and said write point from said identified coordinates of the read point and the write point;

(e) marking the write region in terms of size and shape so as to mark additional image points within the write image region and identifying the coordinates of said additional image points;

(f) determining coordinates of corresponding additional image points within said read image region from the coordinates of said additional image points within said write image region, said corresponding additional image points within said read image region being in each case spaced from said additional image points within said write image region by said determined vector distance;

(g) generating for at least one of the color components of the image points marked within said write image region substitution color values related to the original color values of the corresponding image points within said read image region; and (h) replacing said original color values of the image points within said write image region by said substitution color values to obtain a retouched color image within the write image region, whereby a desired copying retouch of the color image is achieved.

2. A method for copying retouch of a color image by transferring image information from a read image region of a color image to a write image region of said color image in electronic color image reproduction, wherein original color signals are obtained by image-point-by-image-point and trichromatic scanning of the color image, the original color signals are converted into digital original color values for a plurality of different color components of the color signals, the digital original color values are stored in a storage medium image-point-by-image-point and wherein coordinates of selected image points in said color image are identified with a movable marker and an associated coordinate identification means, said identified coordinates of the selected image points addressing corresponding digital color values of said selected image points in said storage medium, comprising the steps of:

(a) marking an image point with the marker as a read point within the read image region of the color image to be retouched, said read image region defining a portion of said color image from which image information is to be taken;

(b) marking an image point as a write point within the write image region of the color image to be retouched, said write image region defining a portion of said color image into which the image information taken from said read imge region is to be transferred;

(c) identifying coordinates of said marked read point and said marked write point;

(d) determining a vector distance between said read point and said write point from said identified coordinates of the read point and the write point;

(e) marking the write region in terms of size and shape by guiding the marker in adjacent strokes like a retouch brush so as to mark additional image points within the write image region, and identifying the coordinates of said additional image points;

(f) substantially simultaneously determining coordinates of corresponding additional image points within said read image region from the coordinates of said additional image points within said write image region, said corresponding additional image points within said read image region being in each case spaced from said additional image points within said write image region by said determined vector distance;

(g) generating for at least one of the color components of the image points marked within said write image region digital substitution color values related to the digital color values of the corresponding image points within said read image region; and (h) replacing said digital original color values of the image points within said write image region by said digital substitution color values to obtain a retouched color image within the write image region, whereby a desired copying retouch of the color image is achieved.

3. A method according to claim 2 including the step of generating said substitution color values for a given color component from original color values of the same color component.

4. A method according to claim 2 including the step of generating said substitution color values for a given color component from original color values of a different color component.

5. A method according to claim 2 including the step of generating said substitution color values from original color values of image points within both said read and write image regions.

6. A method according to claim 2 including the step of generating said substitution color values by a weighted addition of original color values of the corresponding image points within said read image region and original color values of said image points within said write image region.

7. A method according to claim 2 including the steps of:

(a) displaying said color image or said retouched color image on a color monitor for visual control;

(b) generating two movable light marks on said color monitor, said two light marks being spaced apart from each other by said determined vector distance; and (c) synchronizing the motion of said two movable light marks with the motion of said movable marker associated with said coordinate identification means.

8. A method according to claim 7 wherein said two light marks are distinguishable from one another.

9. A method according to claim 2 including the steps of:

(a) storing the digital original or substitution color values of said color image or said retouched color image, respectively in at least one image repetition memory;

(b) cyclically reading out said digital color values from said image repetition memory;

(c) converting said read out digital color values into control signals for a color monitor; and (d) displaying said color image or said retouched color image on said color monitor.

10. A method according to claim 2 including the steps of:

(a) simultaneously storing the original color values of said color image in a first image repetition memory and in a second image repetition memory;

(b) replacing at least some of the original color values in the second image repetition memory with said substitution color values to obtain the retouched color image;

(c) selectively connecting the first or second image repetition memory to a color monitor; and (d) displaying said color image or said retouched color image on said color monitor.

11. A method according to claim 2 including the step of cancelling the transferring of image information by replacing said substitution color values with said original color values.

12. A method according to claim 2 including the steps of:

(a) simultaneously identifying coordinates of a plurality of image points surrounding said image points marked by said marker within said write image region, said plurality of image points forming a retouch area around the marked image points so as to simulate the area of a retouch brush would cover when stroked; and (b) simultaneously determining coordinates of a plurality of corresponding image points in a retouch area within said read image region corresponding to said retouch area within the write image region.

13. A method according to claim 12 including the steps of:
(a) displaying said color image or said retouched color image on a color monitor for visual control;
(b) generating two movable enlarged light marks on said color monitor, said two enlarged light marks being spaced apart from each other by said determined vector distance, and said two enlarged light marks making visible said retouch areas within said read and write image regions; and
(c) synchronizing the motion of said two movable enlarged light marks with the motion of said movable marker associated with said coordinate identification means.

14. A method according to claim 13 including the step of providing different sizes for said retouch areas within said read and write image regions.

15. A system for copying retouch of a color image by transferring image information from a read image region of a color image to a write image region of said color image in electronic color image reproduction, wherein original color signals are obtained by image-point-by-image-point and trichromatic scanning of the color image, the original color signals are converted into digital original color values for a plurality of different color components of the color signals, and the digital original color values are stored in a storage medium image-point-by-image-point, comprising:
(a) a movable marker means for marking an image point as a read point within the read image region of the color image to be retouched, and for marking an image point as a write point within the write image region of the color image to be retouched;
(b) coordinate identification means for identifying coordinates of said marked read point and said marked write point;
(c) means for determining a vector distance between said read point and said write point from said identified coordinates;
(d) said movable marker means also for marking additional image points within said write image region and said coordinate identification means also identifying coordinates of said additional marked image points;
(e) means for determining coordinates of corresponding additional image points within said read image region from the coordinates of said additional image points within said write image region, such that the spacing between each of the additional image points within said write image region and the corresponding additional image points within said read image region is said determined vector distance;
(f) means for generating for at least one of the color components of the image points marked within said write image region digital substitution color values related to the digital original color values of the corresponding image points within said read image region; and
(g) means for replacing said digital original color values of the image points within said write image region by said digital substitution color values to obtain a retouched color image within the write image region, whereby a desired copying retouch of the color image is achieved.

16. A system according to claim 15 further including:
(a) an original memory means for storing digital original color values;
(b) a copying memory means for storing digital original and digital substitution color values;
(c) a color monitor means for displaying the original or retouched color image;
(d) a memory control means for calling memory addresses of the original memory means and the copying memory means;
(e) an arithmetic circuit means connected to the original memory means, the copying memory means, and the memory control means for generating substitution color values; and
(f) a coordinate computer means connected to the memory control means, the arithmetic circuit means, and the coordinate identification means for determining coordinates of image points in the read image region from the coordinates in the write image region identified by the marker means.

17. A system according to claim 16 wherein means are provided for selectively connecting the original memory means and the copying memory means to the color monitor means.

18. An apparatus according to claim 16 wherein the coordinate computer means comprises:
(a) a comparison stage means connected to receive identified coordinates of image points of the write image region;
(b) an address counter means controlled by the comparison stage means for cyclically calling coordinate values;
(c) an arithmetic stage means connected to the address counter means for calling auxiliary coordinates;
(d) a first adder stage means connected to the comparison stage means and to the arithmetic stage means for determination of coordinates of image points within the write image region;
(e) a spacing computer means connected to receive identified coordinates of the marked read point and of the marked write point for determination and storage of vector distance coordinates between the read point and the write point;
(f) a second adder stage means connected to receive the identified coordinates of image points of the write image region and the vector distance coordinates; and
(g) a third adder stage means for determination of coordinates of image points within the read image region, said third adder stage means being connected with the arithmetic stage means and with the second adder stage means.

* * * * *